United States Patent

[11] 3,586,962

| [72] | Inventor | Edward C. Rebstock |
| | | 528 Stolp Ave., Syracuse, N.Y. 13207 |
| [21] | Appl. No. | 803,242 |
| [22] | Filed | Feb. 28, 1969 |
| [45] | Patented | June 22, 1971 |

[54] BATTERY CELL MONITORING APPARATUS
1 Claim, 8 Drawing Figs.

[52] U.S. Cl. .................................................. 324/29.5,
320/48, 324/72.5
[51] Int. Cl. ............................................... G01n 27/42
[50] Field of Search .......................................... 324/29.5,
72.5, 158; 136/171.5, 182; 320/48

[56] References Cited
UNITED STATES PATENTS

| 1,266,814 | 5/1918 | Kammerhoff | 136/171.5 |
| 2,644,739 | 7/1953 | Hammond | 324/29.5 |
| 2,690,544 | 9/1954 | Haubursin | 324/29.5 |
| 3,454,859 | 7/1969 | Ford | 324/48 UX |

*Primary Examiner*—Michael J. Lynch
*Attorney*—Bruns & Jenney

ABSTRACT: Monitoring apparatus for a series-connected battery of cells includes a lid equipped with biased contacts arranged so each contact contacts a different one of the cell connectors when in place. Wires from each contact run through a multiprong coupler to a contact of a double wafer switch, a plurality of switches being adapted each to connect pairs of wires for shorting out any selected cell. Each switch wafer has its contacts arranged to successively or selectively connect the connectors on either side of each cell across a voltmeter, the first wafer for about half the cells and the second wafer for the other cells for reading voltages for a pair of cells for each wafer switch position.

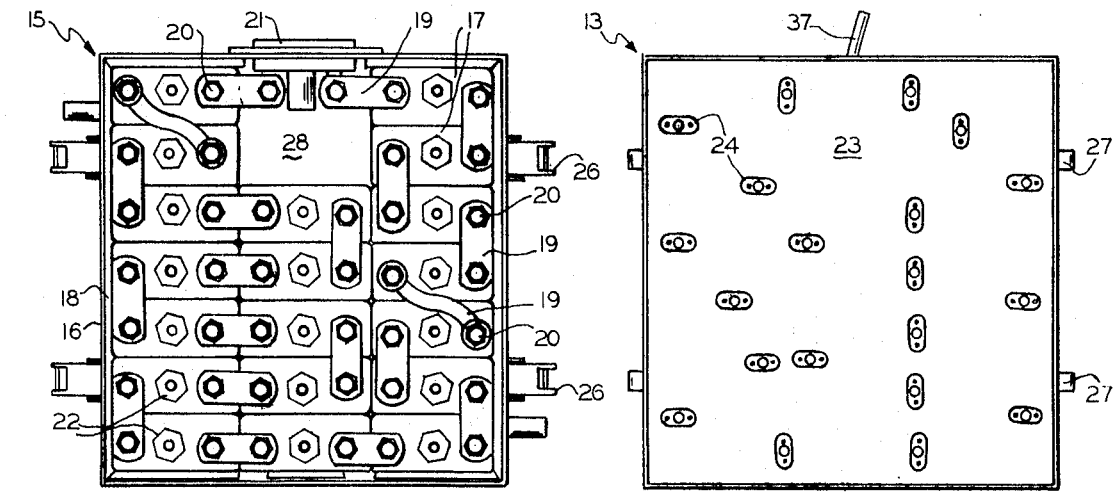
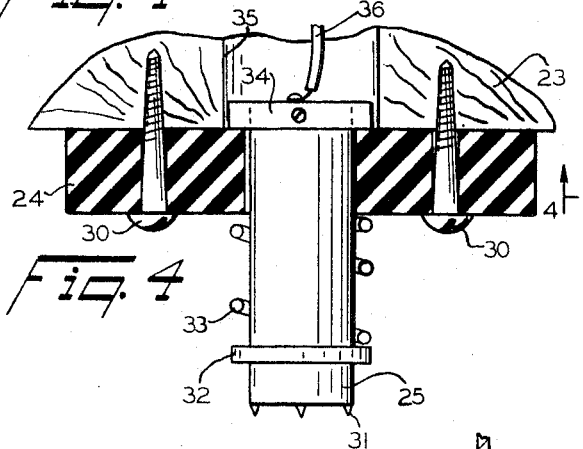
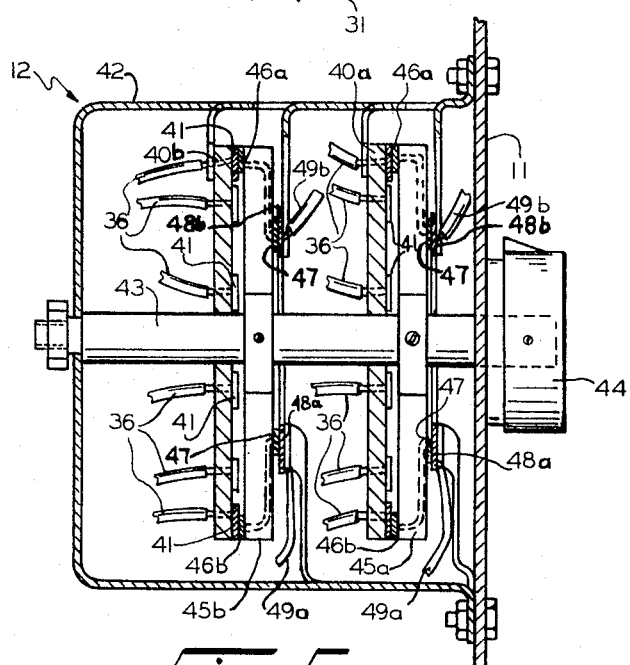
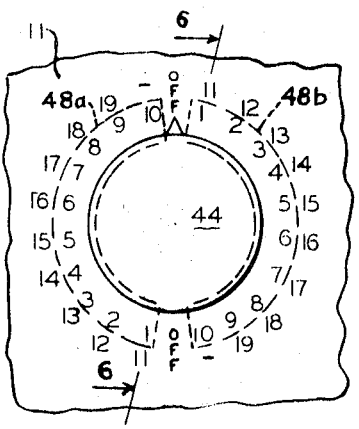
INVENTOR.
EDWARD C. REBSTOCK
BY Bruns and Jenney
att'ys

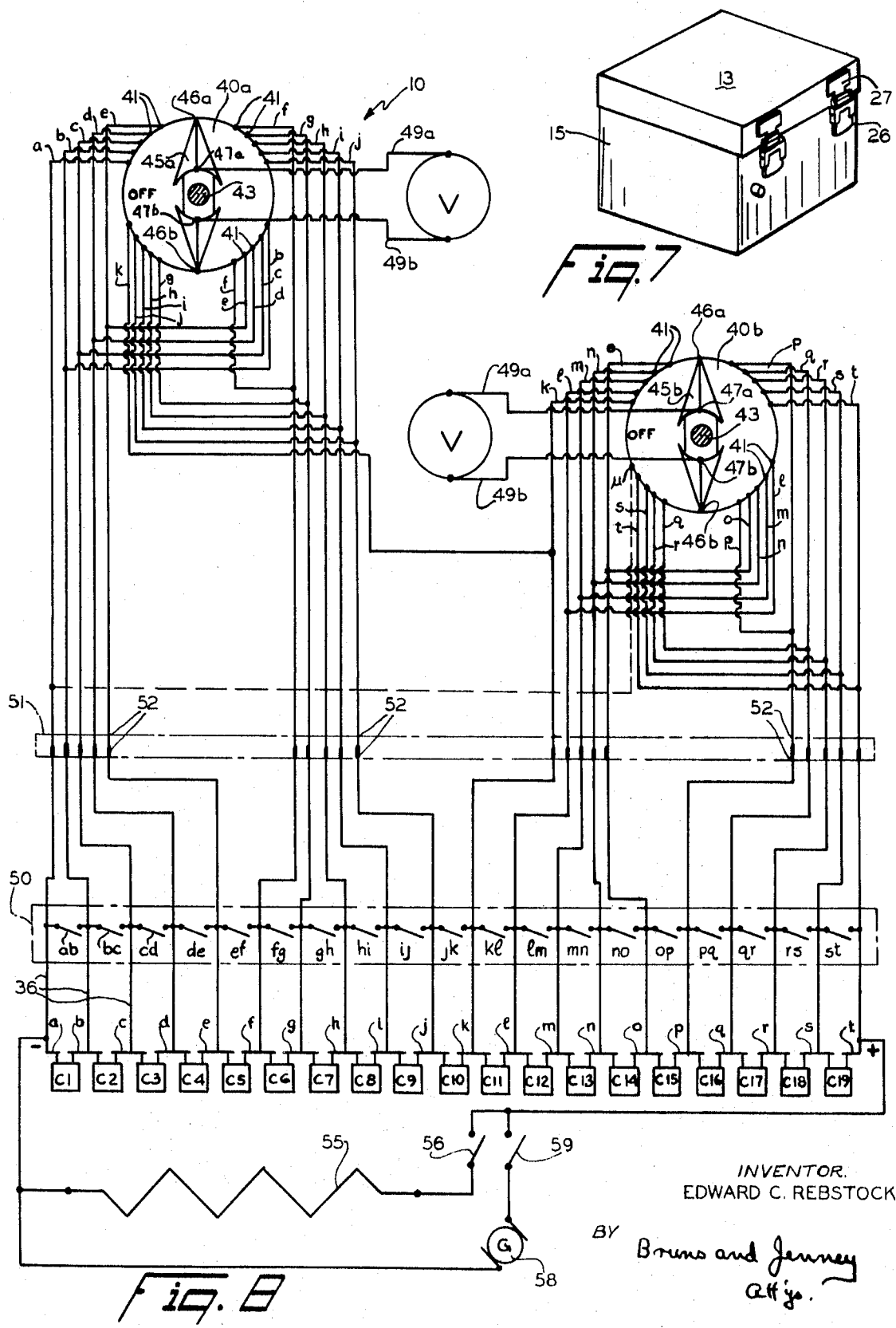

BATTERY CELL MONITORING APPARATUS

BACKGROUND OF THE INVENTION

This invention relates to monitoring apparatus for storage batteries requiring voltage readings across the individual cells thereof during charging and/or discharging.

Certain storage batteries, such as large silver-zinc or nickel-cadmium sintered plate batteries used in aircraft, require frequent monitoring of the voltage across the individual cells during charging and especially during discharging prior to recharging. In nickel-cadmium batteries, for example, the potassium hydroxide electrolyte does not enter into any chemical process so that its specific gravity gives no indication of the state of charge of the cell. Moreover, the voltage reading of a battery is almost constant from a condition of almost complete charge to a condition of almost complete discharge. For these reasons it is difficult to determine the state of charge of a battery. Furthermore a single cell in a battery frequently has to be replaced or repair work is required on the terminals, cells, or connectors.

Complete discharge of the battery is therefore usually necessary before recharging or before working on the battery. During discharge one cell may discharge fully before the others. If this happens it starts to charge in the reverse direction which usually destroys the cell. For that reason, it is during discharge that frequent monitoring of the cells is most important. When a cell has been almost completely discharged it must be shorted out of the battery discharge circuit.

All this, of course, may be done manually and laboriously but this requires constant attendance over long periods. Means have been heretofore devised, however, to lighten the operator's task. First, a wire must be attached to each cell terminal connection to the adjacent cell and to the battery terminals. This, however, is a long and tedious job since the cell connectors are secured to the cell terminals by a cap screw which must be tightened by a torque wrench. The nature of the battery requires that the connectors be secured firmly to prevent sparking. Therefore, a screw must be loosened, the wire end connected, and then the screw again must be tightened—for each connector.

The wires are led to a monitoring device which, by means of a relay operated switch, electrically connects the wire from one connector to the adjacent wire to the next connector through a voltmeter. Then the device breaks this connection and makes another connection through the voltmeter between the second connector and the third connector and so on until the voltage across each cell may be read. This successive voltage reading across the cells in order may be made by an automatic stepping switch but the voltage of only one cell is read at a time and always in the same sequence.

When a cell is found to be almost completely discharged, this cell is shorted out by manually placing a shorting bar across the two connectors secured on either side of the cell. If this is not carefully done, sparking may occur.

After the cells are all discharged, the wires must then be removed, the screws again tightened, and the shorting bars replaced since the battery must remain for as long as 8 hours with each cell shorted before starting the recharge.

SUMMARY OF THE INVENTION

This invention contemplates a means for quickly connecting each wire leading to the voltmeter connecting switch to its appointed connector. A battery cover or lid is provided with spring-pressed contacts so oriented and located in the lid that the lid can be quickly placed on the battery and each lid contact then automatically contacts its appointed connector.

Instead of a switch connecting the connectors on each side of each cell through a single voltmeter successively, a two layer switch is provided for connecting the terminals of two cells across two separate voltmeters at each step of the switch. This switch is operated manually and may be turned in either direction for testing any desired cell or may be turned one step at a time through 180° for testing all the cells successively, two cells at a time. The connections to the switch are made so that all the wires connected to the switch may be located in close proximity to the switch except for the wires leading to the battery cell connectors.

Provision is also made for shorting out the cells selectively by means of switches. A normally open switch is operable to electrically connect each adjacent pair of cell connectors, the switches being connected to the same wires connected to the cell connectors.

Further provision is made for a quick disconnection of all the wires between the shorting switches and the wafer switch so the battery may be left with all its cells shorted out while the rest of the apparatus may be used to monitor another battery.

BRIEF DESCRIPTION OF THE DRAWINGS

FIG. 1 is a plan view of a typical nickel-cadmium storage battery for monitoring which the device of the invention is to be used;

FIG. 2 is a bottom plan view of a case cover for the battery of FIG. 1 equipped with a plurality of contact members according to the invention;

FIG. 3 is a greatly enlarged bottom plan view of one of the contact members;

FIG. 4 is a sectional view on the line 4-4 of FIG. 3;

FIG. 5 is an elevational view of the control knob for the monitoring device and a portion of the panel on which it is mounted;

FIG. 6 is a sectional view on the line 6-6 of FIG. 5 showing the wafer switch of the monitoring apparatus;

FIG. 7 is a perspective view of the battery case and cover of FIGS. 1 and 2; and FIG. 8 is a wiring diagram for the apparatus of the invention.

DESCRIPTION OF THE PREFERRED EMBODIMENT

The monitoring apparatus 10 preferably is partially housed in a cabinet or box, not shown, having a front panel 11 (FIG. 6), and has a wafer switch 12, housed in the cabinet, a battery cover or lid 13 (FIG. 2) equipped with spring pressed battery cell contacts, hereinafter described, and electrical wiring, mainly in the cabinet, as shown in FIG. 8.

A typical nickel-cadmium battery 15, shown in FIG. 1, has a steel casing 16, in which are housed a plurality of cells 17, here nineteen in number, arranged in a particular pattern and separated from the casing by plastic case liners 18. The cells 17 are connected in series by exposed nickel plated copper links or connectors 19 of various shapes connected to the cell terminals by hex head capscrews 20, the two terminal cells having one terminal connected to the positive and negative battery terminal, respectively. The battery terminals are not shown but are housed in a quick-disconnect housing 21. The usual filler cap 22 with gas release valve or vent is provided for each cell 17.

It will be understood that the number of cells is determined by the battery voltage desired, 19 cells producing a 24-volt rating, each cell capable of producing 1.2 to 1.3 volts. Other types of connectors, other than 19, may be used but, for a 19 cell battery, for example, there are only three known patterns of cell and connector arrangement regardless of the manufacturer.

A casing cover or lid 13 is provided for each pattern, the lid having a wooden or other insulating liner 23 (FIG. 4). The liner 23 is provided with a plurality of contact holders 24, as shown in FIG. 2, for holding a spring contact 25, as shown in FIGS. 3 and 4, in position so as to contact each connector 19 of the battery when the lid is secured in position on casing 16.

The battery is provided with toggle-type or other clamps 26 for connection to hooks 27 on the lid 13. Orientation of the lid on the battery is easy because all batteries, like battery 15, have an empty space 28 for heat-detecting means near the battery terminals in housing 21 and the lid will therefore have a similar space unoccupied by holders 24.

The holders 24 are secured to the lid liner 23 as by screws 30 (FIGS. 3 and 4) and are of rubber or plastic or other electrical insulating material. The spring-pressed contact 25 comprises a cylindrical metal member reciprocatably slidable in a hole in holder 24 and is provided with a plurality of pointed projections 31 at its connector-contacting end and a flange 32 adjacent that end. A coil spring 33 around the contact between flange and holder biases the contact away from lid 13. A collar 34 is secured to the upper end of contact 25, limiting the downward travel of the contact, and the collar and upper end of the contact may travel upward in a suitable hole 35 in the lid liner 23.

A wire 36 is electrically connected to the upper end of each contact 25 and the wires 36 extend between lid 13 and liner 23 to a suitable exit from the lid where they are gathered in a cable 37 (FIG. 2) and the cable extends through certain switches and couplings hereinafter described to the cabinet or housing for switch 12 where each wire 36 is connected to one or more contacts on the switch 12.

Referring now to FIGS. 5 and 6, the switch 12 comprises a double wafer switch, each wafer 40a and 40b having 20 contacts 41, as shown diagrammatically in FIG. 8 but preferably equiangularly spaced about the "Off" position as indicated in FIGS. 5 and 6. The wafers 40 are spaced one behind the other and are supported by and secured on a squirrel cage type of switch body 42 which, in turn, is secured to the panel 11 as indicated.

An axially extending rotary switch operating shaft 43, passing through the wafers 40 and the panel and operated by a knob 44 secured thereto at the front of the panel, carries two wiper arms 45a and 45b secured thereto. Each wiper arm 45 carries a contact 46a at one end adapted to wipe over and successively contact the contacts 41 and, at the other end, diametrically opposite the contacts 46a, the arm 45 carries another wiper contact 46b adapted to contact the diametrically opposite contact 41.

On each wiper arm 45, each wiper contact 46a and 46b is connected to another contact or brush 47, brush contacts 47 being on the opposite surfaces of wiper arms 45a and b from the wiper contacts 46a and b. Two semicircular slip or collecting rings 48a and 48b are supported concentrically on the switch body 42, forming a split ring collector or slip ring for contacts 47, as best seen in FIG. 5. The semicircular ring 48a is connected by a wire 49a to one side of a voltmeter and the other semicircular ring 48b is connected by a wire 49b to the other side of the voltmeter. Through slip rings 48a and b, the wiper contacts 46a and 46b are continually connected across a voltmeter V, $V_1$ for wiper arm 45a and $V_2$ for wiper arm 45b, as shown in FIG. 8, except when the switch is in the "Off" position. Since the slip rings 48a and 48b form a split ring, the wiper contacts 46a and 46b connect the wafer contacts 41 with the diametrically opposite contact 41 in the same direction through the voltmeter regardless of which brush contact 47 is in contact with which half slip ring 48a or 48b.

The battery cells are numbered $C_1$, $C_2$, $C_3$ etc. through $C_{19}$ in FIG. 8 and the connectors are numbered a through t, as shown, connector a being from cell $C_1$ to the negative battery terminal and connector t being from cell $C_{19}$ to the positive battery terminal. The wires 36 and terminals 41 on the wafers 40a and 40b are also denoted by a letter a through t according to which connector they are electrically connected.

It will be noted that there are 20 contacts 41 on each wafer 40, the contact diametrically opposite contact a being connected to wire b, the contact opposite contact b being connected to the wire c, and so forth. The contact opposite contact j is connected to the wire k which is connected to the first contact of the wafer 40b. It will thus be apparent that by turning the knob 44 step-by-step, connector a will be first connected to connector b through voltmeter $V_1$ and connector k will be connected to connector l through voltmeter $V_2$. At the next step connector b will be connected to connector c through $V_1$ and connector l will be connected to connector m through $V_2$ and so on until connector j is connected to connector k and connector t is connected to the contact u on wafer 40b.

The last contact u is not connected to the battery, although it might be connected to wire a to obtain a voltage reading across the battery terminals, as shown in broken line. The preferred form, however, leaves contact u unconnected because a voltmeter which could measure this higher voltage across the battery and also measure the lower voltage across a single cell would be less accurate or too expensive to justify a battery reading by this apparatus. The battery reading can be taken, when desired, by a separate voltmeter.

A battery of normally open switches ab, bc, cd etc. at 50 are connected between adjacent wires 36 so that when switch ab is closed cell $C_1$ is shorted and when switch bc is closed cell $C_2$ is shorted, and so forth. Although the battery of switches at 50 may be located on the panel 11 of switch 12, it is preferred that the battery be located at the top of the battery lid 13 for reasons which will appear.

At 51 in FIG. 8, a series of 20 prong and socket couplers 52 are represented denoting a cannon-type electrical coupler for quickly connecting and disconnecting all twenty of the wires 36 at a point between switch 12 and the battery of switches at 50. This allows a battery with all its cells shorted out to be quickly disconnected from the remainder of the monitoring device. The device can then be used with another battery lid 13 for monitoring another battery while the first battery cells remain shorted.

A resistor 55 in series with a switch 56 is connected across the battery and a generator 58 in series with another switch 59 is likewise so connected. When discharging the battery switch 56 is closed and when charging the battery switch 59 is closed and the generator is started. While the resistor 55 and generator 58 are shown at the bottom of FIG. 8, for convenience of illustration, obviously the preferred location is in or near to the cabinet containing panel 11.

To discharge the battery 15 a lid 13 equipped with the spring contacts 25 is placed in position and secured on the battery. Switch 56 is closed and the battery discharges through the resistor 55. After a time, estimated by the operator from what he knows of the battery original state of charge, monitoring of the battery cells is started and repeated at intervals.

By turning the knob 44 to the position marked 5—15 in FIG. 5, for instance, a reading for cell 5 may be obtained on voltmeter $V_1$ and a reading for cell 15 may be obtained on voltmeter $V_2$. Likewise the knob may be turned successively to positions 1—11, 2—12 and so on through 180° to position 10 in order to obtain a voltage reading on each of the cells. When a cell voltage reads as low as 0.25 volt it is shorted out by closing the appropriate switch at 50. If cell $C_2$ is to be shorted, for example, switch bc is closed.

Although switch 12 is shown with two wafers and two voltmeters V are provided, it will be obvious that a single wafer switch and a single voltmeter may be used or any number of wafers with the same number of voltmeters.

When all the cells are shorted out, the lid 13, with its switches at 50 all closed, may be left on the battery 15 and the coupler 51 may be disconnected. Another battery, with another lid 13, may then be connected for charging or discharging the new battery.

During charging of the battery, the switch 59 may be closed and generator 58 started. The voltage at each cell may be read during charging, in the same manner as during discharging, by turning the knob 44.

Not only does the quickly applied lid 13 with its spring biased contacts and the quickly operated shorting switches at 50 save the operator time and eliminate work near the electrified battery, but a minimum of intricate wiring is required and, when the battery is discharged, the lid with its shorting switches closed may be quickly disconnected by the connector at 51 and another battery and lid may be attached to the voltmeter-connected portion of the apparatus for monitoring.

I claim:

1. Battery cell monitoring apparatus for batteries having a plurality of more than three electrochemical cells with exposed metal connectors between the series connected cells and between the terminal cells and battery terminals, comprising: a panel adapted to be secured to the top of the battery and having a plurality of downwardly biased contacts thereon, the biased contacts being reciprocally secured to the panel and arranged and spaced in a predetermined design for each contact engaging with a different connector when the panel is secured, all connectors being so engaged, a selector switch having at least one fixed wafer, a plurality of angularly spaced contacts on the wafer, means electrically connecting each biased contact to a pair of wafer contacts, the wafer contacts connected to the connectors on either side of each cell being diametrically oppositely located on the wafer, switch wiper arm means rotatably mounted adjacent each wafer, the arm means having a first and a second contact at diametrically opposite ends of the arm adapted to simultaneously contact diametrically opposite wafer contacts, a voltmeter associated with each wiper arm means, the first and second contacts being substantially continuously electrically connected across the voltmeter, means for manually rotating the wiper arm means for successively and selectively connecting the voltmeter for reading across each cell, indexing means associated with the rotating means for indicating the wafer contacts being contacted by the first and second contacts, and a normally open shorting switch connected between each pair of electrically connecting means connected to adjacent connectors in the cell series for selectively shorting out any selected cell, the shorting switches being secured on the panel top, the electrically connecting means between the shorting switches and the wafer contacts being secured in a single cable having a single separable coupling device therein, the coupling device having separate coupling means for each wire in the cable, whereby the coupling means may all be quickly uncoupled and the selector switch and voltmeter removed leaving the panel on the battery with the shorting switches closed.